United States Patent Office  3,347,793
Patented Oct. 17, 1967

3,347,793
BORATE ESTERS AND GASOLINE OR LUBRICATING OIL COMPOSITIONS
Robert M. Washburn, Whittier, and Franklin A. Billig, Los Angeles, Calif., assignors to American Potash & Chemical Corporation, Los Angeles, Calif., a corporation of Delaware
No drawing. Filed Apr. 23, 1956, Ser. No. 579,916
14 Claims. (Cl. 252—49.6)

This invention relates to certain novel organo-boron compounds and to a process of making them.

The compounds of the present invention have the general formula:

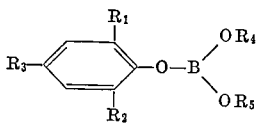

In the above formula, $R_1$ and $R_2$ are the same or different tertiary alkyl radicals which may have from four four to twenty carbon atoms; $R_3$ may be hydrogen, halogen, amino, substituted amino, amido, alkyl, substituted alkyl, substituted aryl, alkoxy, or phenoxy radicals; $R_4$ and $R_5$ may be the same or different normal or secondary alkyl radicals having from one to twelve carbon atoms, e.g., the methyl, isopropyl, n-butyl, or 2-methyl-4-pentyl radicals.

The phenols having the formula:

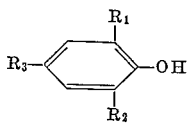

wherein $R_1$, $R_2$ and $R_3$ are defined as above, are known as hindered phenols since both of the ortho positions are occupied by tertiary alkyl radicals which make the compounds relatively unreactive. It has generally been considered that such compounds are capable of forming esters only under forcing conditions, such as reaction of the sodium salt of the phenol with an acid chloride. Surprisingly enough, we have found that hindered phenols will react with primary and secondary alkyl borates to yield the mixed esters of the present invention. For instance, we have found that 2,6-di-tert.-butyl-p-cresol will react with isopropyl borate and that such reaction does not give the tri-ester which might be expected but, rather, gives the mixed ester, 2,6-di-tert.-butyl-p-cresyl-diisopropyl borate, having the following formula:

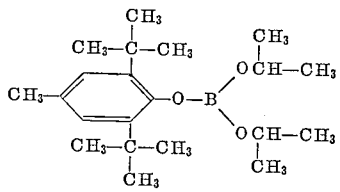

Heretofore, it has been the view that mixed orthoborate esters were not stable and that they would disproportionate. We have found, however, that the novel esters of the present invention are stable, resist hydrolysis to a marked degree and do not readily disproportionate.

To prepare the novel mixed esters of the present invention, it is only necessary to mix together a primary or secondary alkyl borate and a 2,6-di-tert.-alkyl phenol in stiochiometric quantities and react them at reflux temperature of the mixture at some advantageous operating pressure which may be at, above, or below atmospheric pressure.

The following non-limiting examples illustrate the practice of the present invention.

*Example I*

In a 22-liter flask, heated with an electric mantle and fitted with a packed 1.5 inch diameter, 36″ long column, and a motor driven agitator, 2,6-di-tert.-butyl-p-cresyl-diisopropyl borate was prepared batchwise using essentially stoichiometric quantities of reactants. DBPC (13.88 pounds) and isopropyl borate (12.72 pounds) were introduced into the flask and heated under partial reflux (reflux ratio 60:1). Isopropanol (2.59 pounds) was removed as distillate. Residence time was 20 hours. Unreacted isopropyl borate was distilled off and the mixture cooled to 71° C. Methanol (8.7 pounds at 25° C.) was added with stirring. After crystallization occurred and the slurry had cooled to room temperature, the product was filtered, washed with an additional 7.2 pounds of methanol and dried. There was obtained 10.6 pounds of the white crystalline product, M.P. 88–89° C.; purity, 99% ester. Methanol was distilled from the filtrate and the resulting orange viscous oil was found to contain 22% by weight DBPC-diisopropyl borate. The overall yield was 56%.

*Example II.—Preparation of 2,6-di-tert.-butyl-p-cresyl-di-(2-methyl-4-pentyl) borate*

2,6-di-tert.-butyl-p-cresol (38.1 g., 0.17 mole) and tri-(2-methyl-4-pentyl) borate (94.19 g., 0.3 mole) were heated together in a 500 ml. flask equipped with a 10-plate column fitted with a Whitmore-Lux total reflux, partial-take-off head. 2 - methylpentanol - 4 (24.5 ml., theory 21.4 ml.) was slowly removed at a head temperature of 124–131° C./760 mm. The pot temperature rose from 261° C. to 298° C. as alcohol was distilled. Excess tri(2-methyl-4-pentyl) borate (34.7 g., theory 40.6 g.) was distilled at 3.5 mm. A dark, orange-colored viscous oil was obtained on cooling. Yield: 50.2 g., theory 73.5 g. (68%).

*Analysis.*—Calc. for $C_{27}H_{49}O_3B$: B, 2.50%. Found: B, 2.74%.

The excess boron in the product (0.24%) was equivalent to 7 g. tri(2-methyl-4-pentyl) borate not recovered in the stripping operation. The crude product was purified by shaking for 4 hours with water to hydrolyze the remaining tri(2-methyl-4-pentyl) borate. The product, a water-insoluble oil, was separated from the water by extraction with ether and the ether removed by distillation. Vacuum drying gave the product as a light-yellow mobile oil analyzing 2.4% B, which did not crystallize.

*Example III.—Preparation of 2,6-di-tert.-butyl-p-cresyl-diisopropyl borate*

Di-tert.-butyl-p-cresol (1 mole, 220.3 g.) and isopropyl borate (1.0 mole, 188.1 g.) were placed in a 1-liter, 3-necked flask equipped with a stirrer, thermometer and distillation column fitted with a total-reflux partial take-off head. Heat was applied to the reaction mixture and, during 7 hours, 40.3 g. distillate was removed. The unreacted isopropyl borate was removed by distillation and the reaction mixture allowed to cool whereupon a crystalline material was obtained. The white crystalline product melted at 86–87° C., after recrystallization from methanol. Yield: 233.7 g., 76.1%. The infrared absorption spectrum showed no hydroxyl absorption at 2.8–3.0 microns indicating that the OH of the phenol was no longer present. A doublet at 7.4 and 7.6 microns of approximately equal intensity indicated that the product contained isopropyl groups.

*Example IV.—Rate of formation of 2,6-di-tert.-butyl-p-cresyl-diisopropyl borate*

The kinetics of the reaction of DBPC and isopropyl borate to form DBPC diisopropyl borate were studied using a stirred reactor equipped with a distillation column and sampling tube. Stoichiometric quantities of reactants were used. Samples were removed periodically, stripped of unreacted isopropyl borate, and the resulting mixture of DBPC and ester analyzed for ester using infrared absorption of the residual OH (unreacted di-tert.-butyl-p-cresol) at 2.85 microns. Results are given in the following table:

| Time (Hrs.) | Temperature in Reaction (° C). | Wt. Percent Ester |
|---|---|---|
| 0 | 165 | 0 |
| 0.88 | 167 | 14.0 |
| 2.13 | 168 | 25.2 |
| 3.72 | 171 | 35.7 |
| 5.14 | 174 | 46.4 |
| 6.46 | 177 | 51.0 |
| 8.05 | 182 | 56.7 |
| 11.13 | 197 | 73.4 |

*Example V.—Preparation of 2,6-di-tert.-butyl-p-cresyl-di-n-butyl borate*

2,6-di-tert.-butyl-p-cresol (220.34 g., 1.0 mole) and tri-n-butyl borate (230.16 g., 1.0 mole) were heated together in a 1-liter flask equipped with a thermowell and a 30-plate column fitted with a liquid dividing, total-reflux, partial take-off head. n-Butanol (47.4 g., theory 74.12 g.) was removed at 90.5–96.0° C./250 mm. at a reflux ratio of 20:1. The pot temperature rose from 169° C. (initial reflux) to 230° C. The reaction mixture was transferred to a stripping apparatus and unreacted tri-n-butyl borate and 2,6-di-tert.-butyl-p-cresol (142.7 g.) were removed at 152–204° C./28 mm. The residue (250.5 g.) was a red-brown oil.

*Analysis.*—Calc. for $C_{23}H_{41}O_3B$: B, 2.87%. Found: B, 2.82%.

From the crude product, a pure sample of 2,6-di-tert.-butyl-p-cresyl-di-n-butyl borate was prepared by distillation, B.P. 140° C./0.6 mm.; $n_D^{20}$ 1.4790; $d_4^{25}$ 0.9283. Infrared analysis indicated the absence of OH groups, and the presence of B–O bonds, aliphatic straight-chain $CH_2$ and a tetra-substituted benzene ring, thus substantiating the structure as the mixed orthoborate ester.

*Example VI.—Preparation of 2,6-di-tert-butylphenyl-di-isopropyl borate*

2,6-di-tert.-butylphenol (80.0 g., 0.39 mole) and tri-isopropyl borate (73.4 g., 0.39 mole) were caused to react using the procedure and equipment described in Example II.

During the reaction the following fractions were obtained:

| Fraction | Quantity, ml. | Boiling Range,° C./Pressure, mm. | Percent B |
|---|---|---|---|
| 1 | 5.4 | 72–80° C./760 mm | 3.89 |
| 2 | 12.8 | 80–81° C./760 mm | 0.28 |
| 3 | 13.0 | 86° C./760 mm | 1.78 |

During the subsequent stripping operation, the following fractions were obtained:

| Fraction | Quantity, g. | Boiling Range,° C./Pressure, mm. | Percent B |
|---|---|---|---|
| 1 | 9.4 | 48–52° C./0.5 mm | 3.27 |
| 2 | 32.8 | 86–92° C./0.5 mm | 1.27 |
| 3 | 21.6 | 72–77° C./0.1 mm | 2.30 |
| 4 | 35.1 | 77° C./0.1 mm | 3.22 |
| 5 | 27.4 | Liquid pot residue | 3.22 |

*Analysis.*—Calc. for $C_{20}H_{35}O_3B$: B, 3.24%. Found: B, 3.01, 3.22%.

Infrared analysis indicated that Fraction 1 was mainly unreacted triisopropyl borate and isopropanol. Fraction 4 showed no absorption at 2.85 microns (OH), and showed a doublet absorption of approximately equal intensity at 7.23 and 7.31 microns (CH deformation in the isopropyl group) and was, therefore, essentially pure 2,6-di-tert.-butylphenyl-diisopropyl borate. Fractions 4 and 5 represent a yield of 47.9%. The infrared spectra and analyses of Fractions 4 and 5 demonstrate that the mixed ester was formed rather than the symmetrical triphenyl ester (1.73% B), or the diphenyl-monoalkyl ester (2.35% B). This is confirmation that sufficiently bulky 2,6-substituents, as the tert.-butyl group, prevent formation of the symmetrical triaryl ester.

*Example VII.—Preparation of 2,4,6-tri-tert.-butylphenyl-diisopropyl borate*

2,4,6-tri-tert.-butylphenol (50.0 g., 0.191 mole) and tri-isopropyl borate (36.0 g., 0.191 mole) were caused to react using the procedure and equipment described in Example II. During the reaction, the reactor temperatures rose to 308° C. and 4.4 ml. of isopropyl alcohol (14.6 ml. theory) was removed. The reactor contents were stripped in vacuo (1–2 mm. Hg, pot temp. 126° C.) and a dark brown viscous oil, insoluble in methanol and acetone, was obtained. The addition of methanol resulted in the precipitation of fine white crystals, which were further purified by washing with methanol and acetone and drying in vacuo. The product analyzed 2.97% B (2.77% theory), M.P. 209–215° C.

*Example VIII.*—In a similar manner other new compounds within the scope of this invention can be prepared having the general formula:

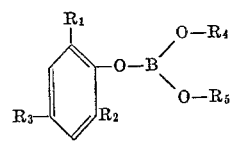

where $R_1$, $R_2$, $R_3$, $R_4$ and $R_5$ are the radicals shown in the following table.

| $R_1$ | $R_2$ | $R_3$ | $R_4$ | $R_5$ | Mol. Weight | Percent B |
|---|---|---|---|---|---|---|
| $CH_3-\underset{\underset{CH_3}{\|}}{\overset{\overset{CH_3}{\|}}{C}}-$ | $CH_3-\underset{\underset{CH_3}{\|}}{\overset{\overset{CH_3}{\|}}{C}}-$ | $CH_3CH_2-$ | $\underset{CH_3}{\overset{CH_3}{\diagdown}}CH-$ | $\underset{CH_3}{\overset{CH_3}{\diagdown}}CH-$ | 362.36 | 2.99 |
| $CH_3-\underset{\underset{CH_3}{\|}}{\overset{\overset{CH_3}{\|}}{C}}-$ | $CH_3-\underset{\underset{CH_3}{\|}}{\overset{\overset{CH_3}{\|}}{C}}-$ | $\underset{CH_3}{\overset{CH_3}{\diagdown}}CH-$ | $\underset{CH_3}{\overset{CH_3}{\diagdown}}CH-$ | $\underset{CH_3}{\overset{CH_3}{\diagdown}}CH-$ | 376.39 | 2.87 |
| $CH_3-\underset{\underset{CH_3}{\|}}{\overset{\overset{CH_3}{\|}}{C}}-$ | $CH_3-\underset{\underset{CH_3}{\|}}{\overset{\overset{CH_3}{\|}}{C}}-$ | $Cl-$ | $\underset{CH_3}{\overset{CH_3}{\diagdown}}CH-$ | $\underset{CH_3}{\overset{CH_3}{\diagdown}}CH-$ | 368.76 | 2.93 |

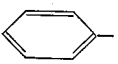

Example IX

The hydrolytic stability of the DBPC-diisopropyl borate ester was tested in water over a period of thirteen weeks. A 0.9086 g. sample of ester (3.02% B, M.P. 86°–87° C.; calc. for $C_{21}H_{37}O_3B$, 3.11% B), was refluxed eight hours with a mixture of 25 ml. water and 15 ml. acetone, in which the ester was insoluble. The mixture was cooled to room temperature, and the system sealed from the air and stored for thirteen weeks. The mixture was then filtered, and 0.7960 g. ester was recovered (M.P. 86–87.5° C., 3.01% B); an additional 0.1082 g. was recovered from the walls of the condenser for a total recovery of 99.51%. No boron was found in the water-acetone filtrate. A second sample of 0.9846 g. ester from the same preparation was left in contact at room temperature with a mixture of 25 ml. water-15 ml. acetone for thirteen weeks. In this case, 0.9430 g. ester (M.P. 86°–87° C., 3.07% B) was collected for a total recovery of 95.77%. The water-acetone filtrate was free of boron. The DBPC-diisopropyl borate is therefore hydrolytically stable in water-acetone under the test conditions of eight hours reflux, or storage for at least three months at room temperature.

The compounds of the present invention are useful as additives in petroleum products and may be added to greases, oils, gasoline or kerosene, serving as effective anti-oxidants.

We claim:
1. A borate ester of the formula:

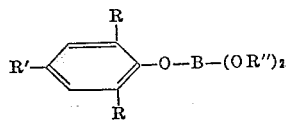

where R represents a tertiary alkyl radical, R' is selected from the group consisting of hydrogen and lower alkyl radicals and R" represents a lower alkyl radical.

2. A borate ester of the formula:

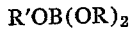

where R' is a 2,6-di-tertiary alkyl phenyl radical, said alkyls each having at least four carbon atoms, said phenyl also having in the 4 position a substituent selected from the group consisting of hydrogen, lower alkyl, chloro, phenyl, amino, lower alkoxy and acetamido, and R is selected from the group consisting of primary and secondary alkyl radicals having between 1 and 12 carbon atoms.

3. The product of claim 2 where R' is 2,6-di-tertiary butyl phenyl.
4. The product of claim 2 wherein R' is 2,6-di-tertiary amyl phenyl.
5. The product of claim 2 wherein R is methyl.
6. The product of claim 2 wherein R is propyl.
7. The product of claim 2 wherein R is butyl.
8. 2,6-di-tert.-butyl-p-cresyl-diisopropyl borate.
9. 2,6-di-tert.-butyl-phenyl-diisopropyl borate.
10. 2,4,6-tri-tert.-butylphenyl-diisopropyl borate.
11. 2,6-di-tert.-butyl - p - cresyl-di-(2-methyl-4-pentyl) borate.
12. 2,6-di-tert.-butyl-p-cresyl-di-n-butyl borate.
13. As a composition of matter, gasoline containing a borate ester of the formula:

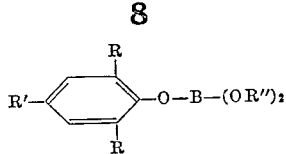

where R represents a tertiary alkyl radical, R' is selected from the group consisting of hydrogen and lower alkyl radicals, and R" represents a lower alkyl radical.

14. As a composition of matter, lubricating oil containing a borate ester of the formula:

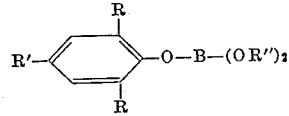

where R represents a tertiary alkyl radical, R' is selected from the group consisting of hydrogen and lower alkyl radicals, and R" represents a lower alkyl radical.

References Cited
UNITED STATES PATENTS

| | | | |
|---|---|---|---|
| 2,160,917 | 6/1939 | Shoemaker et al. | 260—462 X |
| 2,260,336 | 10/1941 | Prescott et al. | 260—462 |
| 2,587,753 | 3/1952 | O'Connor et al. | 260—462 X |
| 2,642,453 | 6/1953 | Lippincott | 260—462 |

OTHER REFERENCES

Thomas, "Journal Chem. Society" (London), 1946, pp. 823–824, 260–462.

CHARLES B. PARKER, *Primary Examiner.*

WILLIAM G. WILES, R, L, CAMPBELL, L. D. ROSDOL, *Examiners.*

L. A. SEBASTIAN, F. D. WOLFFE,
*Assistant Examiners.*